(12) United States Patent
Kraus et al.

(10) Patent No.: US 7,997,773 B2
(45) Date of Patent: Aug. 16, 2011

(54) RETAINING WIRES

(75) Inventors: David P. Kraus, Amherst, NH (US); David Villeneuve, Bedford, NH (US)

(73) Assignee: Velcro Industries B.V., Curacao ( * ) Notice: Subject to any disclaimer, the term of this patent is extended or adjusted under 35 U.S.C. 154(b) by 305 days.

(21) Appl. No.: 12/267,291

(22) Filed: Nov. 7, 2008

(65) Prior Publication Data

US 2010/0118554 A1 May 13, 2010

(51) Int. Cl.
*H01B 7/00* (2006.01)
(52) U.S. Cl. .............. 362/396; 362/249.01; 362/249.11
(58) Field of Classification Search .............. 362/396, 362/249.01–249.09, 249.1–249.19, 565–568, 362/121–124, 234, 253, 806–809; 248/71
See application file for complete search history.

(56) References Cited

U.S. PATENT DOCUMENTS

| | | | |
|---|---|---|---|
| 2,397,291 A | | 3/1946 | Robertson |
| 3,015,869 A | | 1/1962 | Rapata |
| 3,193,329 A | * | 7/1965 | Hribar, Jr. .................... 298/8 R |
| 3,206,712 A | * | 9/1965 | Schick et al. ................. 439/419 |
| 4,660,790 A | | 4/1987 | Muz |
| 4,775,121 A | | 10/1988 | Carty |
| D298,711 S | | 11/1988 | Lowance |
| D326,999 S | | 6/1992 | Johnson et al. |
| 5,141,192 A | | 8/1992 | Adams |
| 5,142,461 A | * | 8/1992 | Nugent ..................... 362/249.16 |
| D333,257 S | | 2/1993 | Newcomer et al. |
| D334,134 S | | 3/1993 | Newcomer et al. |
| D336,421 S | | 6/1993 | Grubicy et al. |
| 5,653,414 A | * | 8/1997 | Chimel ....................... 248/316.7 |
| 5,921,511 A | | 7/1999 | LaPointe |
| 6,050,701 A | * | 4/2000 | Stone ........................ 362/249.11 |
| D424,922 S | | 5/2000 | Sherman et al. |
| 6,142,429 A | | 11/2000 | Ahroni |
| 6,484,365 B1 | | 11/2002 | Thompson |
| D471,787 S | | 3/2003 | Gebrara |
| D508,394 S | | 8/2005 | Moffatt et al. |
| D534,060 S | | 12/2006 | Kiely |
| 7,326,855 B2 | | 2/2008 | Moffatt |
| 7,547,110 B2 | * | 6/2009 | Vaught .......................... 362/123 |
| 2007/0235597 A1 | | 10/2007 | Winchester |

OTHER PUBLICATIONS

Velcro Brand Fasteners—Outdoor Light Clips—back side of clip package.
Tesa Powerstrips—back side of powerstrip package.

* cited by examiner

*Primary Examiner* — Bao Q Truong
(74) *Attorney, Agent, or Firm* — Fish & Richardson P.C.

(57) ABSTRACT

A wire retaining system includes a wire clip and fastening receiver for releasable attachment of a wire clip on a supporting surface to retain a wire. The receiver includes an adhesive backing and touch fastener elements. The wire clip includes two wire receptacles with respective receptacle openings facing different directions and touch fastener elements for engagement with the touch fastener elements of the receiver. A first receptacle is oriented with the receptacle opening facing a desired direction and the wire extends across the receptacle. The releasable wire clip can be reoriented with the second receptacle facing a desired direction and a second wire extending across the second receptacle. The wire clip can be packaged preassembled on a light strand with the touch fastener elements of the wire clip and receiver engaged. A method of forming fastener products includes forming a rigid extrusion having fastener elements formed from extruded rail segments.

37 Claims, 7 Drawing Sheets

RETAINING WIRES

FIELD OF THE INVENTION

This invention relates to retaining wires and other longitudinally continuous, flexible strands to support surfaces, to associated devices, and to methods of forming rigid fastener products.

BACKGROUND

How to easily and securely retain wires and other such strands to supporting surfaces is a common problem. One general solution is to provide discrete clips that hold the wire at spaced apart intervals and are attached to a supporting surface, such as by adhesive or other permanent fastening.

Light strings are commonly hung during various holidays to decorate homes and buildings, and it is typically intended that such light strings be removed and reinstalled at least annually. Proposed light retaining devices range from loose hanging wire rain gutter hooks to permanently anchored bracketry. Loose hanging devices are easily dislodged by wind or other forces. Permanent brackets are sometime unsightly or leave the support surface marred after removal. Such retaining devices generally provide but a single hanger for hanging a single strand of lights.

What is sought is an improved method of readily securing wires or other continuous strands, such as light strings, to a supporting structure and facilitating removal and reinstallation of such strands, and improved methods of forming fastener clips and other rigid structures.

SUMMARY

One aspect of the invention features a method of retaining a wire to a support surface. The method includes affixing a fastening receiver to the support surface, the fastening receiver having a surface carrying a plurality of touch fastener elements. The method further includes selecting a desired orientation of a wire clip defining two wire receptacle with respective receptacle openings facing substantially opposite directions, the clip having a surface carrying a plurality of touch fastener elements releasably engageable with the touch fastener elements of the receiver in each of a plurality of orientations. The wire clip is supported on the support surface in the selected orientation by engagement of the touch fastener elements of the wire clip with the touch fastener elements of the receiver, such that a selected opening of a first of the receptacles faces in a first desired, direction. Thus, a wire extending across the first receptacle of the wire clip is retained to the support surface.

In some applications, affixing the fastening receiver includes removing a release liner from a pressure sensitive adhesive backing on the fastening receiver and pressing the adhesive backing against the support surface in a desired location.

In some applications, the fastening receiver is affixed while the touch fastener elements of the receiver and the touch fastener elements of the wire clip are releasably engaged.

In some cases, the wire is inserted into the receptacle after the wire clip is supported on the support surface.

In some cases, the desired orientation is selected before the receiver is affixed to the support surface.

In some applications, the wire is inserted into the receptacle channel prior to affixing the fastening receiver and wire clip combination on the support surfaces.

In some cases, affixing the fastening receiver, selecting the orientation of the wire clip and supporting the wire clip and wire on the support surface are performed substantially simultaneously with the wire clip preassembled onto the wire and the fastening receiver preengaged with the wire clip.

In some applications, the fastening receiver is attached to the support surface at spaced apart intervals corresponding to the locations of a plurality of wire clips on the wire.

In some cases, a second wire is inserted into the second receptacle through the respective receptacle opening.

In some applications, the touch fastener elements of the fastening receiver and wire clip are of a self-engaging construction.

In some cases, the touch fasteners of one of the receiver and the wire clip include hook engageable loops and touch fastener elements of the other of the receiver and wire clip include hooks.

In some cases, affixing the receiver includes affixing an elongated strip of receiver material to accommodate multiple wire clips along a length of the strip of receiver material.

In some cases, the wire clip is reoriented with the second receptacle-facing a desired direction and positioning a second wire in the second receptacle.

Another aspect of the invention features a wire clip system including a fastening receiver with an adhesive side and a touch fastener side opposite the adhesive side, the touch fastener side having a surface carrying touch fastener elements. A wire clip includes, a base carrying touch fastener elements releasably engageable with the touch fastener elements of the receiver in a plurality of orientations; and a clip body connected to the base and defining two wire receptacles with respective openings facing substantially opposite directions each receptacle sized to receive and retain a wire, such that in each of a plurality of alternate, selectable orientations the wire clip is releasably connectable to the receiver with a corresponding one of the receptacle openings facing a desired direction.

In some cases, the clip body includes a continuous serpentine strip of resilient material.

In some embodiments, the fastening receiver is substantially transparent or translucent.

In some embodiments, the touch fastener elements of one of the receiver and the wire clip; includes hook-engageable loops and the touch fastener elements of the other of the receiver and the wire clip includes hooks.

In some embodiments, the touch fastener elements of both the receiver and the wire clip includes self-engaging fastener elements.

In some embodiments, the wire clip system is contained in a package with the touch fastener elements of the receiver and wire clip releasably engaged.

In some cases, the wire clip system is contained in a package with a plurality of wire clips attached at spaced apart intervals to a light strand.

In some cases, the touch fastener elements of the wire clip are secured to the base by adhesive.

In some cases, the touch fastener elements of the wire clip and the base of the wire clip, together form a single, seamless mass of resin.

In some embodiments, the wire clip body is of constant molded profile between opposite, severed side surfaces.

In some embodiments, the receptacle opening includes an outward flare enlarging of the receptacle opening during insertion of a wire.

In some embodiments, receiver includes a continuous band of fastener tape with an adhesive backing for attachment of the receiver to a support surface, the continuous band configured to enable attachment of the wire clip at a plurality of locations along the continuous band receiver.

In some cases, the wire clip is an injection molded article.

In some cases, the wire clip is metal.

In some embodiments, the second receptacle is sized to retain a different gauge of wire than the first receptacle.

In some embodiment, a release liner covers a pressure sensitive adhesive on the receiver for adhering the receiver to a support surface.

In some cases, the touch fastener elements are secured to the base by one of pressure sensitive adhesive and holt melt adhesive. In some cases, the touch fastener elements are secured to the base by RF welding, ultrasonic welding or hot wedge welding. In other cases, the touch fastener elements are formed by molding a flowable resin on the base. In some cases, the touch fastener elements of the wire clip are integral with the base, the base and the touch fastener elements being formed of a single continuous resin.

In some embodiments, the receptacle opening includes an outward flare for enlarging the receptacle opening during insertion of a wire.

In some embodiments, the receiver includes a continuous band of fastener tape with an adhesive backing for attachment of the receiver to a support surface, the continuous band configured to enable attachment of the wire clip at a plurality of locations along the continuous band of receiver material.

In some embodiments, the wire clip and receiver include self engaging structures that allow for reversible or omni-directional orientation of the wire clip. For example, the self-engaging touch fastener elements may be constructed as directional hooks to allow for selection of which of the receptacles is to face upwards. Alternatively, the self-engaging fastener elements may be constructed as an omni-directional self-engaging structure (e.g., mushrooms) to enable orientation of a selected receptacle in any desired direction.

In some embodiments, the wire clip is configured to clip to the upper front edge of a rain gutter. In some cases, the profile of a second receptacle can be configured to correspond to the profile of the rain gutter edge to provide a secure attachment.

In some embodiments, the wire clip includes touch fastener elements on a second surface adjacent the base.

Another aspect of the invention features a strand of decorative lights including a longitudinally elongated wire supporting a plurality of lights and a plurality of wire clips retained on the wire at spaced apart intervals. The wire clips include a first receptacle for retaining the wire and a base connected to the receptacle and carrying touch fastener elements. A plurality of fastening receivers carrying touch fastener elements releasably engageable with the touch fastener elements of the wire clips.

In some embodiments, the plurality of fastening receivers are of a continuous elongated strip to enable attachment of any of the wire clips anywhere along the length of the elongated strip.

In some embodiments, the touch fastener elements of the wire clips and of the fastening receivers are of a mutually-engaging construction.

In some embodiments, the touch fastener elements of the wire clips include one of an array of hook elements and a field of loop elements and the touch fastener elements of the fastening receivers include the other of an array of hook elements and a field of loop elements.

In some cases, the light strand is packaged with the touch fastener elements of the fastening receivers engaged with the touch fastener elements of a corresponding wire clip.

In some cases, the fastening receivers include a pressure sensitive adhesive backing covered by a release liner.

In some cases, the wire clip is a second receptacle configured to retain the wire clip to the front upper edge of a rain gutter.

In some cases, the wire clip includes a second receptacle configured to retain a second wire.

In some embodiments, the wire clip includes touch fastener elements on a second surface adjacent to the base.

In some embodiments, the fastening receiver is substantially transparent or translucent.

Yet another aspect of the invention relates to methods of forming rigid structures having integrally formed male touch fastener elements. The method includes extruding an elongated body with a shaped profile (of, e.g., a clip) formed of resin while simultaneously extruding rails shaped like male touch fastener element profiles integral with an extruded surface of the body, then cutting through the extruded rails to form an array of spaced-apart, discrete male touch fastener elements, either by removing discrete lengths of each rail to provide spacing between adjacent, remaining rail segments, or by stretching the extruded body after cutting the rails so as to space apart the rail segments, and then cutting the extruded body into individual pieces, each piece comprising a rigid segment of the extruded body with a field of spaced-apart fastener elements. By this method, arrays of fastener elements may be formed extending from rigid surfaces, resulting in a cost-effective production of products having a rigid, extruded body and associated fastener elements, in which the body and the fastener elements form a single, seamless mass of extruded resin.

By "rigid" we mean that the object has a determined shape to which the object returns after temporary distension in normal use. The clips described herein are "rigid" although the wall defining the receptacles is resilient as discussed below. By "rigid" we mean to distinguish sheet-form products that flex under their own weight, for example, or that do not return to their original shape when loads are released during normal use.

Various embodiments of the invention may provide advantages including selection between receptacles for retaining a wire in a given orientation, ease of installation and seasonal reinstallation, ease of reorientation, accommodation of a range of wire gauges or sizes, and ease of removal of lights and the wire clips for storage.

Preassembled or packaged combinations of wire clip and receiver and/or wire clip and light strand may provide additional advantages in ease of seasonal installation and removal. For example, wire clips may be packaged securely attached to a strand of lights and provided with touch fastener elements such that installation requires only affixing the receivers and pressing the light strand with the wire clip into position on the receiver and such that removal simply requires pulling on the wire or clip to release the touch fastener engagement. Alternatively, the receivers can also be engaged with the wire clips as packaged with the light strand such that assembling the light strand, wire clip and receiver on the support surface is performed by simply removing the preassembled light strand with wire clips and engaged receivers from the packaging, removing a release liner on the receiver and attaching the assembly to the support surface.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
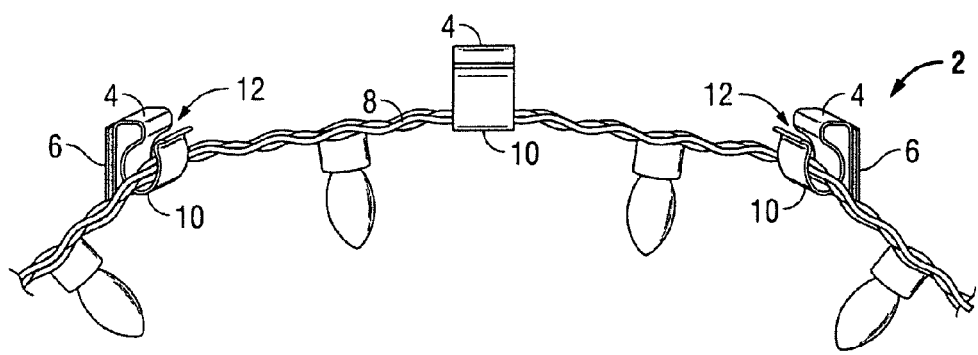
FIG. 1 is a perspective view of a releasable wire retaining system, shown retaining a three-wire strand of lights.

With reference to FIG. 1, a wire retention system 2 is shown including a number of wire clips 4 releasably attached to respective fastening receivers 6 to retain a wire 8 (e.g., braided three-wire strand) of a light string. Wire clips 4 include a first receptacle 10 constructed to retain wire 8 and a receptacle opening 12 facing a first desired direction for receiving wire 8 into receptacle 10.

Fastening receiver 6 is affixed to a support surface by an adhesive backing or other attachment means. In some cases, the attachment of receiver 6 to the support surface is permanent, meaning that it is not intended to be removed and is attached by means that may involve damage to the support surface or the receiver if it is removed. In other cases, the attachment of receiver 6 is temporary, meaning that the attachment means is configured for removal without damage to the surface to which the retainer is affixed. Receiver 6 may be affixed by a pressure-sensitive adhesive that is provided on the back surface of the receiver and covered with a release liner until use. Wire clip 4 is releasably attached to fastening receiver by a touch fastening including complementary touch fastener elements on both receiver 6 and wire clip 4.

Figure 2:
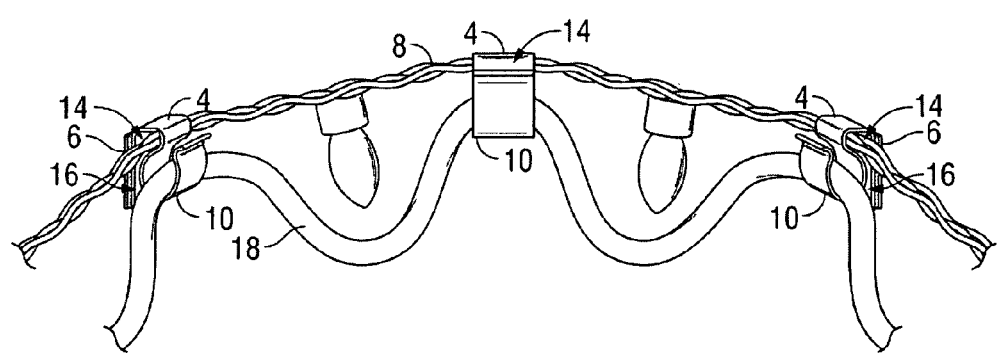
FIG. 2 is a perspective view of the releasable wire retaining system of FIG. 1 retaining a three-wire strand of lights and a rope light in separate receptacles.

FIG. 2 shows the wire retention system 2 of FIG. 1 also retaining a second wire 18 of a rope light in corresponding second receptacles 14 of wire clips 4. Receptacles 14 have receptacle openings 16 facing in opposite directions to the openings 12 of the receptacles 10 holding wire 8. Thus, openings 16 receive wire 18 from a second desired direction substantially opposite the direction of receptacle openings 12. Wire clip 4 can thus retain a single or multiple wires wire 8 or 18 in either or both receptacles 10, 14.

Each wire clip 4 can be releasably secured to receiver 6 with either receptacle opening 12, 16 facing upward (e.g., such that gravity tends to urge the retained wire away from the opening). The orientation of each wire clip 4 can be selected after its corresponding receiver 6 is permanently secured to a supporting surface, and the orientation of each clip may likewise be changed over time, without removing its corresponding receiver 6. Also, the clips 4 of the system are interchangeable with each other, meaning that each clip can be releasably engaged with each receiver 6.

Wire clip 4 is preferably formed of a resilient material, such as PVC, polystyrene, ABS, polyolefin or other plastic or metal material. UV resistant materials are desirable for outdoor applications. The material is molded in a serpentine structure with relatively constant wall thickness. In some cases, the serpentine structure is of constant profile across the width of the clip, to facilitate forming the clips by extrusion, as discussed below. The clips may be molded of a clear resin to reduce their visual effect, or may be molded of a color to blend in with a given supporting surface, for example.

Receptacles 10 and 14 can be sized to accommodate wires of different diameter. For example, wire 18 is shown as a rope light and wire 8 is shown as a traditional three-wire string of bulb lights. Receptacles 10 and 14 can alternatively or additionally be used to retain other objects such as tinsel, decorations, ornaments and the like.

Wire clip 4 is constructed of a resilient resin to allow openings 12 and 16 to be temporarily enlarged to receive wires 8 and 18 and gripping of the wires in receptacles 10 and 14, such that for some applications with wire clip openings are sized to retain wires even when the opening is facing downward.

In some applications, fastening receivers 6 are affixed to a support surface using a pressure sensitive adhesive backing. For example, receivers 6 can be packaged with a pressure sensitive adhesive backing and release liner covering the pressure sensitive adhesive backing. The release liner is removed and receiver 6 is pressed onto the support surface. Such adhesives may require use of a solvent to remove receiver 6 in some cases.

Figure 4:
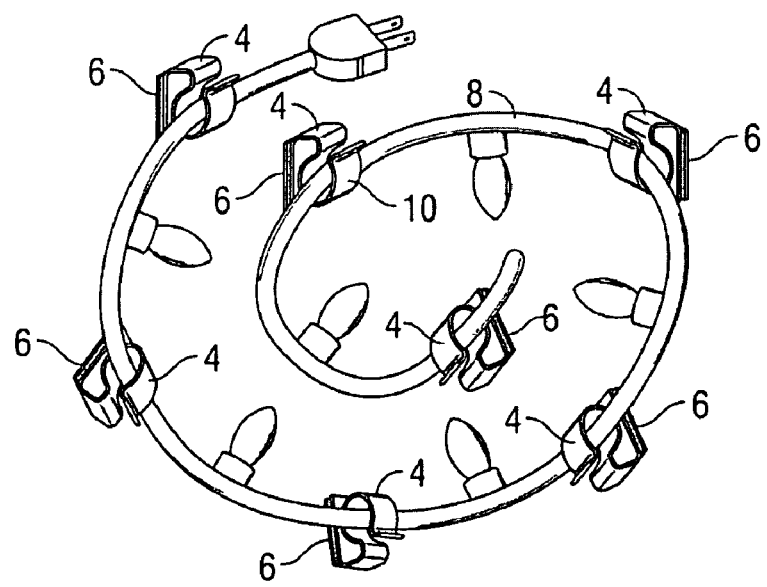
FIG. 4 is a view of a packaged light strand including pre-assembled wire clips and receivers.

In some embodiments, fastening receivers 6 with a pressure sensitive adhesive backing and release liner are packaged pre-engaged with wire clips 4 such that the wire clips and associated receivers are first secured to a support surface (such as by grasping a clip, peeling off the release liner from its attached receiver, positioning the clip where desired, pressing to adhere the receiver, and then detaching the clip). In some cases, the clips and pre-attached receivers are clipped onto wires prior to affixing the receivers 6 to a support surface. For example, FIG. 4 shows a strand of decorative lights packaged with clips 4 and pre-engaged receivers 6 pre-assembled on the light strand at spaced-apart intervals.

Figure 3:
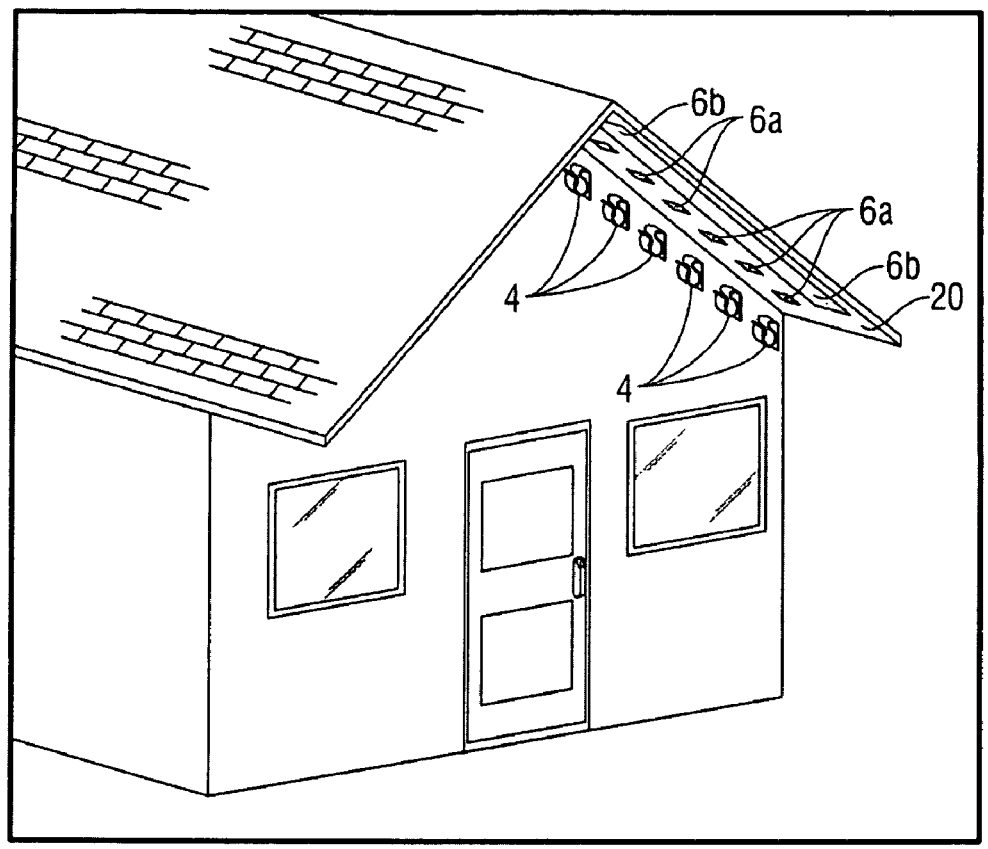
FIG. 3 is a view of a releasable wire retaining system installations on a structure.

With reference to FIG. 3, fastening receivers 6 can be affixed to a support surface 20 such a rain gutter, gable or underside of the eaves of a house. Receivers 6 can be affixed to surface 20 as discrete fastening receivers 6a or can be affixed to surface 20 as a continuous strip of fastening receiver material 6b. A continuous fastening receiver 6b accommodates multiple wire clips 4 and multiple different positions and orientations of wire clips 4, and enables repositioning wire clips 4 in different locations along its length, such as for retaining different light displays.

In some cases, fastening receiver 6 includes clear touch fastener elements extending across or from a clear base, such that the color of the underlying surface 20 is visible through the receiver. For example, fastening receiver 6 can include transparent hook elements or a relatively clear field of loops. This may be particularly desirable when receivers 6 are to be left in place between seasonal uses, for example.

Figure 5:
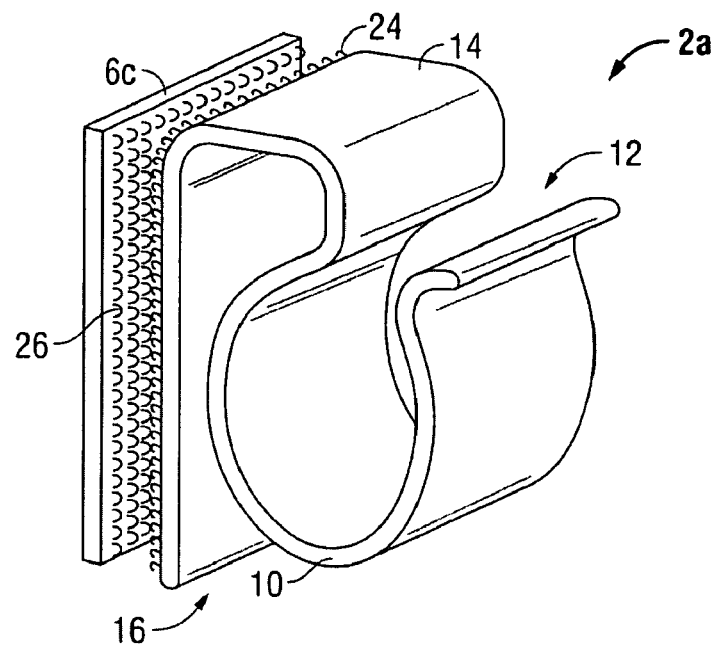
FIGS. 5 and 6 are alternate embodiments of a releasable wire retaining system including a wife clip and a retainer joined by hook and loop touch fastenings.

FIG. 5 shows a wire retention system 2a including a wire clip 4a having first and second receptacles 10 and 14 and first and second receptacle openings 12 and 16. The anchor point or base 22 of wire clip 4 includes a region of touch fastener elements 24 such as an array of hook elements. The hook elements can be commonly or randomly directionally oriented across base 22. In some cases, touch fastener elements 24 are omni-directional hooks, for example with a mushroom shaped head for engaging a field of loops.

Receiver 6c includes a region of touch fastener elements 26. In some cases receiver 6c is a flexible material and touch fastener elements 26 are a field of hook engageable loops. In some cases, receiver 6c includes a flexible fabric, paper, film or non-woven base for touch fastener elements 26. In other cases, receiver 6c includes rigid or semi-rigid base for touch fastener elements 26.

Touch fastener elements 24 or 26 can be secured respectively to wire clip 4 and receiver 6c by a pressure sensitive adhesive or hot melt adhesive. Alternatively, touch fastener elements 24 or 26 may be formed integrally with wife clip 4 or receiver 6. For example, by molding, melt bonding or other suitable forming or bonding process.

Touch fastener elements 24 and 26 are releasably engageable to allow wire clip 4 to be oriented in a first desired position and affixed to receiver 6 and to be released from receiver 6 to be reoriented in a second desired position.

Figure 6:
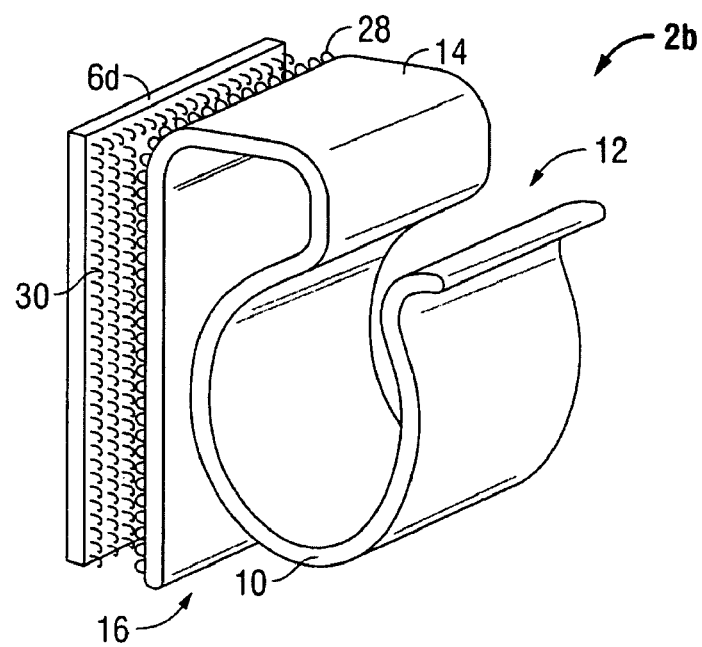

FIG. 6 shows a wire retention system 2b including a wire clip 4b having first and second receptacles 10, 14 and first and second receptacle openings 12 and 16. The anchor point or base 22 of wire clip 4b includes a region of touch fastener elements 28 such as field of hook engageable loops. In some cases, touch fastener elements 28 are adhered to base 22. Suitable loop material is a lightweight nylon knit loop tape available as Loop 3905 from Velcro Industries.

Receiver 6c includes a region of touch fastener elements 30 such as an array of hooks. In some cases receiver 6c is a flexible material. In some cases, receiver 6c includes a flexible, fabric, paper, film or non-woven base for touch fastener elements 30. In other cases, receiver 6c includes a rigid or semi-rigid base for touch fastener elements 30. One suitable hook material for use on receiver 6c is a clear polypropylene resin hook available as HTH-721 from Velcro Industries.

Suitable means for forming touch fastener elements 24, 26, 28, 30 on flexible resin tape are disclosed in U.S. Pat. No. 4,775,310. Suitable methods of injection molding rigid bases with arrays of touch fastener elements are disclosed in U.S. Pat. Nos. 5,368,549, 5,656,226. The contents of each of the patents mentioned herein are incorporated herein in their entirety.

Figure 7:
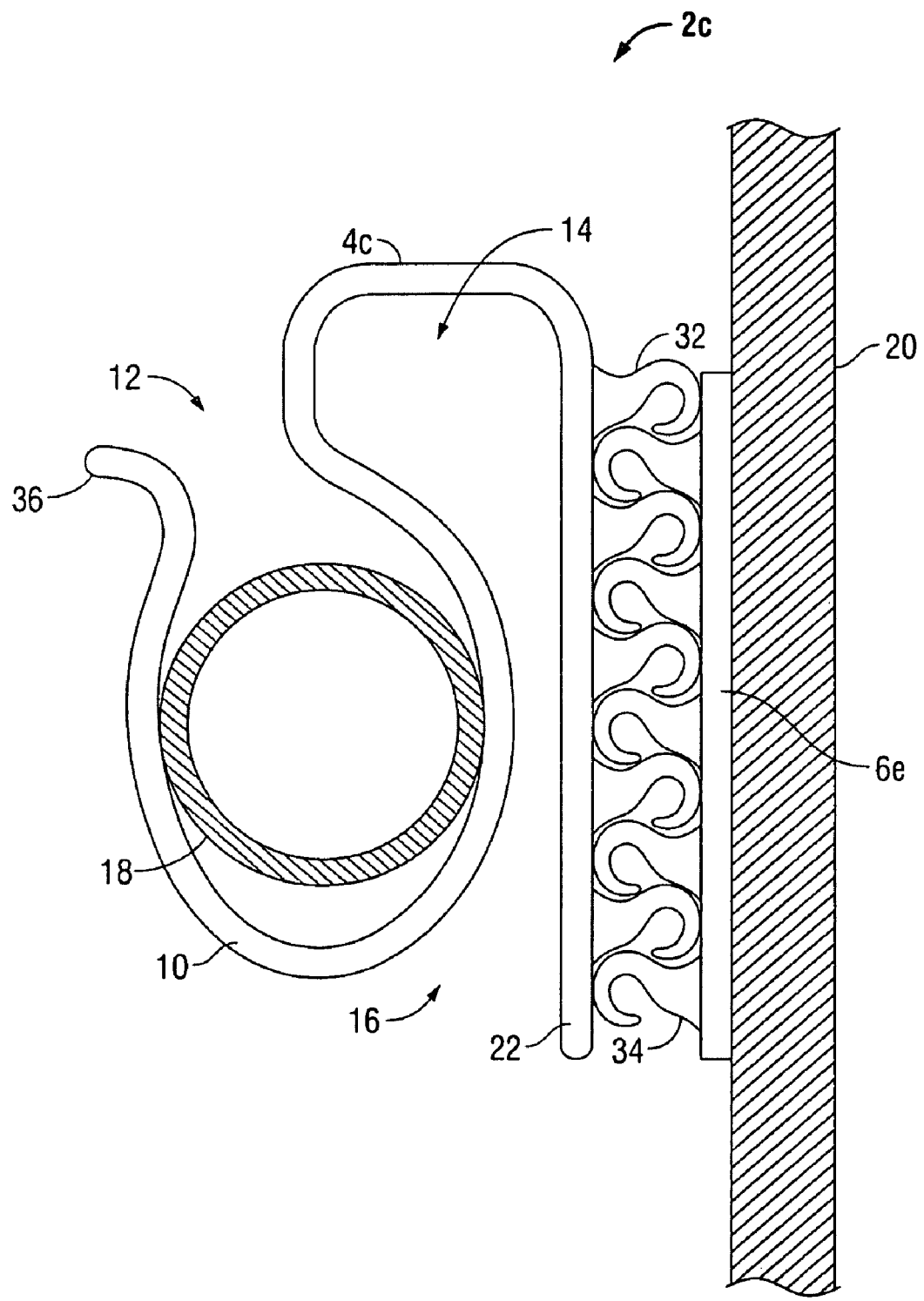
FIG. 7 is a side view of a releasable wire retaining system with a self-engaging hook fastening, with the wire clip installed in a first orientation and retaining a rope light.

FIG. 7 shows a wire retention system 2c including a wire clip 4c defining first and second receptacles 10 and 14 and first and second receptacle openings 12 and 16. Wire clip 4c is oriented such that receptacle opening 12 is facing upwards with receptacle 10 retaining a wire 8 (e.g., a rope light). The tip 36 of clip 4c is curved outward, away from opening 12, to enable grasping of the tip to distend the clip to temporarily enlarge opening 12 during insertion of wire 8 and during extraction of wire 8. As shown in this profile view, the clip body 15 is in the form of a serpentine wall of clip 4c that begins at one end of flat base 22, curves downward to form a wall that is both the outer wall defining receptacle 14 and the inner wall defining receptacle 10, and then curves upward to form the outer wall of receptacle 10, with the distal end 36 of the serpentine wall curved outward. The nominal thickness "t" of the wall and base is about 1 millimeter. As shown, base 22 is molded with an array of molded touch fastener hooks 32 configured to releasably engage an identical array of touch fastener hooks 32 on receiver 6e.

Figure 8:
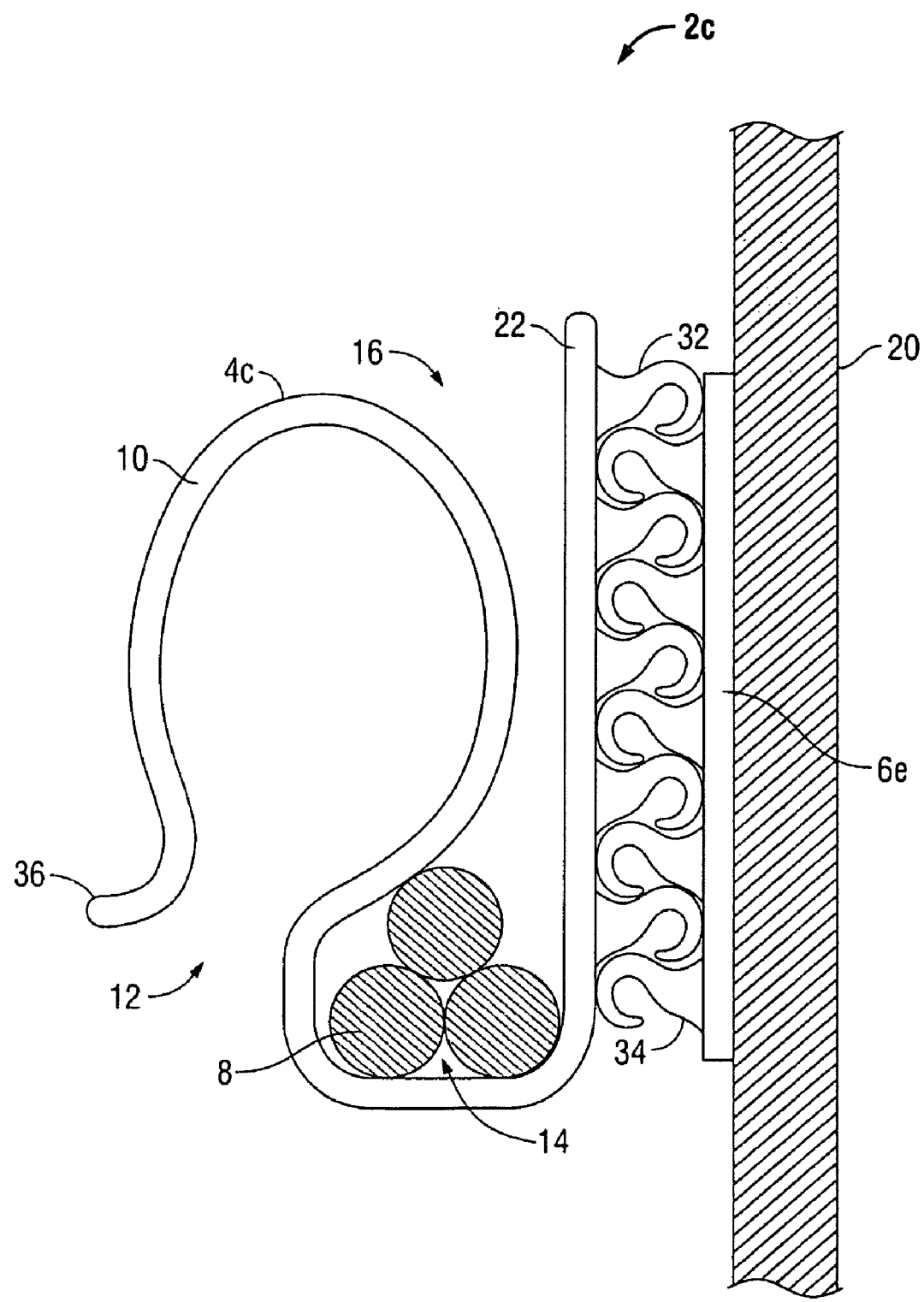
FIG. 8 shows the releasable wire retaining system of FIG. 6, with the wire clip installed in a second orientation and retaining a three-wire light strand.

Fastening receiver 6e has a flat base that is affixed to support surface 20 by a pressure sensitive adhesive. Touch fastener elements 32 are configured and arrayed to be of a self-engaging construction that permits engagement of wire clip 4c and receiver 6e in each of two, opposite orientations. FIG. 8 shows the same wire retention system 2c with the wire clip 4c reattached to receiver 6e in an opposite orientation, to retain a wire 18 in the inner receptacle 14. Accordingly, wire clip 4c is positionable to orient a selected one of openings 12 and 16 towards a desired direction.

Such self-engaging touch fastener hooks 32 can be shaped and arranged in rows and columns as described in U.S. patent application Ser. No. 12/167,538, the contents of which are incorporated herein in their entirety. Other self-engaging fastener element arrays feature male fastener elements that are in the shape of mushrooms, with heads extending laterally in substantially all directions from underlying stems. By self-engaging fastener element arrays we mean to include all male fastener element arrays configured, for releasable engagement with another male fastener element array. In some cases, the two self-engaging fastener element arrays are identical.

In a particular embodiment, wire clip 4 is formed with a base and receptacle wall thickness of about 1 mm. Receptacle 10 is about 13 mm in diameter and receptacle 14 is about 8 mm wide and 5 mm deep. Opening 12 is about 4 mm across and opening 16 is about 1.5 mm across. Tip 36 extends about 1.5 mm beyond the outer diameter of receptacle 10. This configuration maintains the larger receptacle 10 relatively close to base 22 in either orientation to minimize the moment arm of the weight of the light strand about base 22 and to minimize unintentional separation of wire clip 4 and receiver 6.

Wire clip 4 is about 27 mm tall and base 22 is about 12.5-25 mm wide, to provide sufficient attachment surface area to support a one half inch rope light at about 2 foot intervals. Wire clip is configured to support about one half pound per wire clip. The wall thickness, material flexibility and receptacle radii are selected to provide for spreading of openings 12 and 16 to receive and release wires 8 or 18 as desired.

By providing a small opening 12 relative to the diameter of receptacle 10, a wide range of wire-sizes may be retained within receptacle 10, even when oriented facing downward. Similarly, by sizing receptacle 14 with a relatively small opening 16, a range of wire-sizes or number of wires can be readily retained.

Figure 9A:
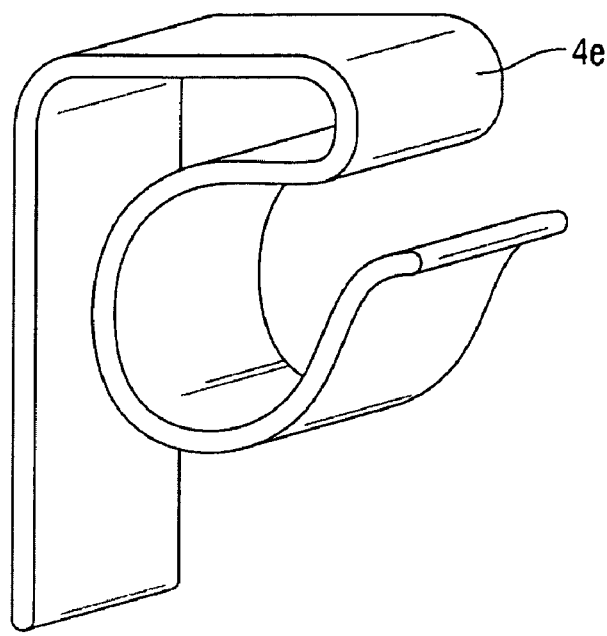
FIGS. 9a-9b show other configurations for the releasable wire retaining system.
Figure 9B:
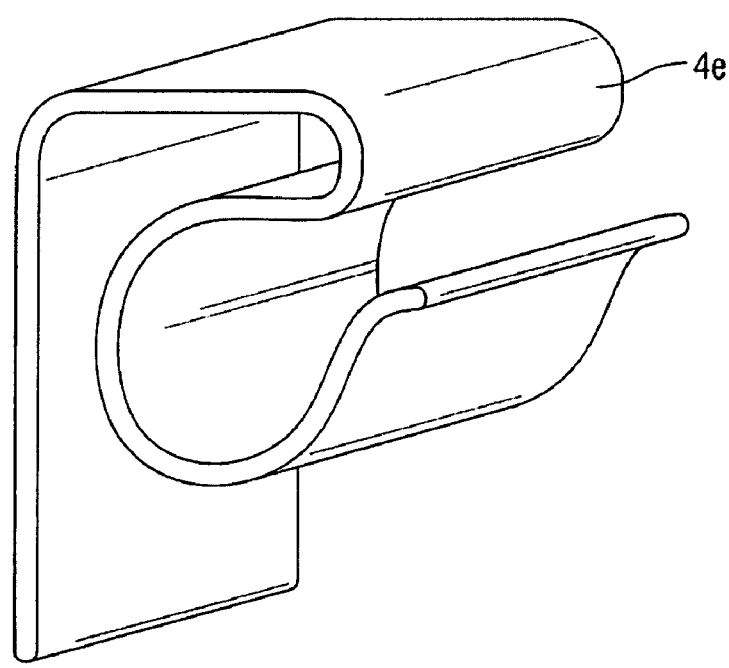

FIGS. 9a-9b illustrate other embodiments of wire clip 4e having a different receptacle shape. Different receptacle shapes can be selected to accommodate different combinations of wires or to provide varying degrees of spacing of receptacles from the base or form each other. FIG. 8b shows a wider version of the wire clip 4e of FIG. 8a, which will support a heavier load, for example to allow greater distance between wire clips 4 in an installation.

One method of retaining a wire and wire retainer clip on a support surface includes affixing a fastening receiver 6 to a support surface 20. The fastening receiver includes a plurality of touch fastener elements for engagement with complementary touch fastener elements on a wire clip. The wire clip defines two wire receptacle channels, with respective receptacle channel openings facing substantially opposite directions. The clip includes touch fastener elements releasably engageable with the touch fastener elements of the receiver in multiple orientations. The wire clip is releasably attached to the fastening receiver in a selected orientation by engaging touch fastener elements of the wire clip with the touch fastener elements of the receiver, with an opening of a first of the receptacle channels corresponding to a first desired orientation. A wire extends across the first receptacle channel, and is retained by the wire clip.

In some-cases, the wire is a light strand prepackaged with the wire clips installed. In some cases, the receivers are also engaged with the wire clips as prepackaged. This provides advantages of convenience in installation and removal of the light strand.

In other cases, the wire is inserted through the opening of the first receptacle channel after affixing the receiver to the support surface and engaging the wire clip touch fastener elements with the receiver touch fastener elements. Still in another case, the wire is inserted into the wire clip and then the wire clip is engaged with the receiver.

The touch fastening between the wire clip and retainer are readily released to allow reorienting of the wire clip on the receiver to position a selected receptacle and receptacle opening facing in a desired direction to retain a wire.

A release liner covers a pressure sensitive adhesive backing on the fastening receiver and is removed before positioning the receiver in a desired affixed location. In some cases, one touch fastener component is adhered to the wire clip and the receiver is mated to the wire clip as packaged. Alternatively, the wire clip can be packaged with loose mated touch fastener strips each having an adhesive backing and release liner, allowing the installer to decide which touch fastener component to use as the receiver on the support surface and which touch fastener component to adhere to the wire clip. The release liner is removed and the combined wire clip and receiver are positioned and affixed on the support surface. The wire clip can then be disengaged from the receiver to be repositioned, for example, to select which of the receptacles is to face up and which is to face down.

Still in other applications, prepackaged wire clip and receiver combinations can be assembled along a length of wire. The release liner of each receiver adhesive backing is then removed and the wire, wire clip and receiver are positioned with a single action on the support surface. Similarly, as shown in FIG. 4, a light strand can be packaged with the wire clip preassembled along a length of wire and the receivers engaged with the wire clips.

The clear receiver can be left on the support surface for future use and the wire clips can be left assembled to the wire during storage of the wire for ease of reinstallation later. Alternatively, the receiver can be removed by peeling from the support surface, with the aid of a solvent if needed, and the wire clips can be removed from the wire.

In some applications, the receiver is a continuous strand applied along a portion of a support surface, for example, along the under edge of a roof or along a wall or ceiling. Accordingly, any number of wire clips can then be mated to the receiver at any number of desired locations and orientations. Wire clips can thus be used to secure lights, wires, tinsel, decorations, mist lines, cables and other strand-like objects.

Figure 10:
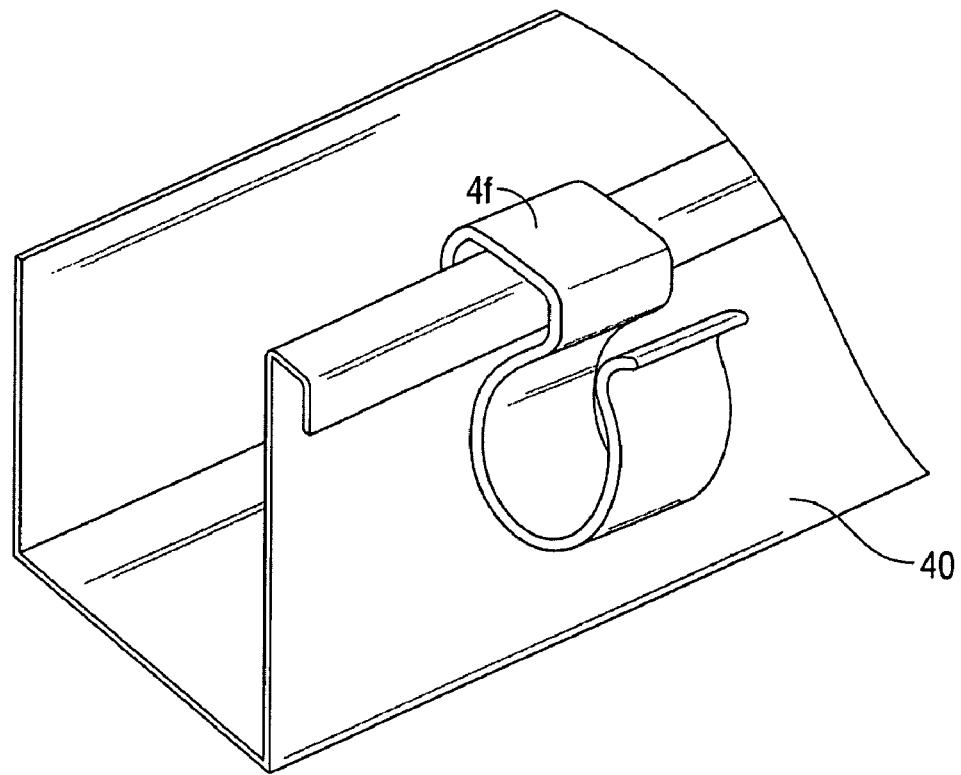
FIG. 10 shows the releasable wire clip installed on the front of a rain gutter.

FIG. 10 illustrates a wire clip 4f attached to the upper front edge of a rain gutter 40. Wire clip 4f is of sufficient flexibility that opening 16 is spreadable to accept the edge of rain gutter 40 into receptacle 14. Wire clip 4f is sized and constructed to correspond to a common rain gutter front edge profile or profiles. FIG. 10 also shows wife clip 4f with a region of touch fastener elements 42 adjacent base 22. Provision of touch fastener elements on two perpendicularly adjacent surfaces increases the fastening strength when engaged with receivers present on both a wall and ceiling or other intersecting support surfaces.

Figure 11:
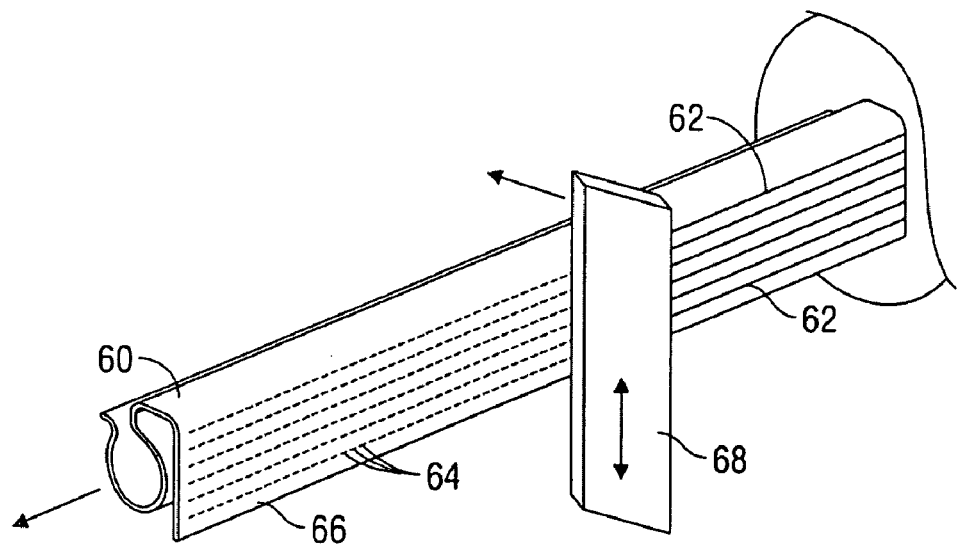
FIG. 11 illustrates a method of extruding a wire clip profile while forming spaced apart hook elements.

FIG. 11 illustrates a method of making wire clips 4 formed with integral male fastener elements by extrusion. A wire clip profile extrusion 60 is formed with continuous extruded rails 62 each having the profile of a row of desired touch fastener elements 64, extending from an extruded surface that forms the base 66 or backside of extrusion 60. A cutter 68 cuts continuous rails 62 to form discrete rail segments that become individual touch fastener elements 64. Cutter 68 can be a reciprocating, rotary, thermal, sonic or other suitable type of cutter.

In one manufacturing method, cutter 68 has a thickness corresponding to a desired separation distance between adjacent fastener elements 64 of each row, such that cutting the rails forms the array of spaced-apart elements 64 without further processing.

In another manufacturing method, extrusion 60 is stretched or otherwise elongated after cutting rails 62, to extend the distance between adjacent touch fastener elements 64. Permanent elongation of extrusion 60 can be performed while the extrusion is relatively soft. For example, extrusion can be continually drawn during the extrusion and cutting processes. Alternatively, the extrusion, cutting and elongating processes may be sequentially performed. In either method, extrusion 60 is relatively rigid when cooled and segmented into individual wire clips that each exhibit the profile shape of the original extrusion. In another method, the cut rail touch fastener elements are heat shrunk to provide spacing between elements.

Still in other cases, extrusion 60 is formed without any touch fastener elements, which are added following extrusion. In one example, a hook tape or loop tape having a pressure sensitive adhesive backing is adhered to extrusion 60. In another example, male touch fastener elements are formed by applying a liquid resin to surface 66 of extrusion 60, and by molding male fastener elements from the liquid resin under pressure applied against extrusion 60.

In another manufacturing method, wire clips 4 are extruded as longer sections (e.g., twelve feet long) and a continuous strip of loop or hook tape is applied to the base 66 of the extrusion 60. For example a loop tape can be adhered with a pressure sensitive adhesive or with a hold melt adhesive. A second cutter (not shown) is used to sever sections of extrusion 60 into discrete wire clips 4 having touch fastener elements on base 22, 66.

In another manufacturing method (not shown) a complete wire clip 4 is molded with an integral array of male fastener elements in a closed cavity, by standard injection molding techniques.

In another manufacturing method (not shown) wire clip 4 is formed as an extrusion and the touch fastener elements are formed on base 22 by kerfing.

A number of embodiments of the invention have been described. Nevertheless, it will be understood that various modifications may be made without departing from the spirit and scope of the invention. For example, touch fastener elements can be provided on any number of surfaces of wire clip 4, e.g., base 22 and an adjacent top surface of wire clip 4 to provide additional fastening to resist separation of wire clip 4 and receiver 6. In another example, a releasable magnetic fastening can be provided on the wire clip and receiver. Accordingly, other embodiments are within the scope of the following claims.

What is claimed is:

1. A method of retaining a wire to a support surface, the method comprising:
affixing a fastening receiver to the support surface, the fastening receiver having a surface carrying a plurality of touch fastener elements;
selecting a desired orientation of a wire clip defining two wire receptacle with respective receptacle openings facing substantially opposite directions, the clip having a surface carrying a plurality of touch fastener elements releasably engageable with the touch fastener elements of the receiver in each of a plurality of orientations;

supporting the wire clip on the support surface in the selected orientation by engagement of the touch fastener elements of the wire clip with the touch fastener elements of the receiver, such that a selected opening of a first of the receptacles faces in a first desired direction; and retaining to the support surface, a wire extending across the first receptacle of the wire clip.

2. The method of claim 1, wherein affixing the fastening receiver includes removing a release liner from a pressure sensitive adhesive backing on the fastening receiver and pressing the adhesive backing against the support surface in a desired location.

3. The method of claim 1, wherein the fastening receiver is affixed while the touch fastener elements of the receiver and the touch fastener elements of the wire clip are releasably engaged.

4. The method of claim 1, further comprising inserting the wire into the receptacle after the wire clip is supported on the support surface.

5. The method of claim 1, wherein the desired orientation is selected before the receiver is affixed to the support surface.

6. The method of claim 1, wherein affixing the fastening receiver, selecting the orientation of the wire clip and supporting the wire clip and wire on the support surface are performed substantially simultaneously with the wire clip preassembled onto the wire and the fastening receiver preengaged with the wire clip.

7. The method of claim 6, wherein the fastening receiver is attached to the support surface at spaced apart intervals corresponding to the locations of a plurality of wire clips on the wire.

8. The method of claim 1, further comprising inserting a second wire into the second receptacle through the respective receptacle opening.

9. The method of claim 1, wherein the touch fastener elements of the fastening receiver and wire clip are of a self-engaging construction.

10. The method of claim 1, wherein the touch fasteners of one of the receiver and the wire clip comprise hook engageable loops and touch fastener elements of the other of the receiver and wire clip comprise hooks.

11. The method of claim 1, wherein affixing the receiver includes affixing an elongated strip of receiver material to accommodate multiple wire clips along a length of the strip of receiver material.

12. The method of claim 1, further comprising reorienting the wire clip with the second receptacle-facing a desired direction and positioning a second wire in the second receptacle.

13. A wire clip system comprising:
a fastening receiver with an adhesive side and a touch fastener side opposite the adhesive side, the touch fastener side having a surface carrying touch fastener elements; and
a wire clip comprising:
a base carrying touch fastener elements releasably engageable with the touch fastener elements of the receiver in a plurality of orientations; and
a clip body connected to the base and defining two wire receptacles with respective openings facing substantially opposite directions each receptacle sized to receive and retain a wire, such that in each of a plurality of alternate, selectable orientations the wire clip is releasably connectable to the receiver with a corresponding one of the receptacle openings facing a desired direction.

14. The wire clip system of claim 13, wherein the clip body comprises a continuous serpentine strip of resilient material.

15. The wire clip system of claim 13, wherein the fastening receiver is substantially transparent or translucent.

16. The wire clip system of claim 13, wherein the touch fastener elements of one of the receiver and the wire clip comprises hook-engageable loops and the touch fastener elements of the other of the receiver and the wire clip comprise hooks.

17. The wire clip system of claim 13, wherein the touch fastener elements of both the receiver and the wire clip comprise self-engaging fastener elements.

18. The wire clip system of claim 13, contained in a package with the touch fastener elements of the receiver and wire clip releasably engaged.

19. The wire clip system of claim 13, contained in a package with a plurality of wire clips attached at spaced apart intervals to a light strand.

20. The wire clip system of claim 13 wherein the touch fastener elements of the wire clip are secured to the base by adhesive.

21. The wire clip system of claim 13, wherein the touch fastener elements of the wire clip and the base of the wire clip together form a single, seamless mass of resin.

22. The wire clip system of claim 13, wherein the wire clip body is of constant molded profile between opposite, severed side surfaces.

23. The wire clip system of claim 13, wherein the receptacle opening includes an outward flare enlarging of the receptacle opening during insertion of a wire.

24. The wire clip system of claim 13, wherein the receiver comprises a continuous band of fastener tape with an adhesive backing for attachment of the receiver to a support surface, the continuous band configured to enable attachment of the wire clip at a plurality of locations along the continuous band receiver.

25. The wire clip system of claim 13, wherein the wire clip comprises an injection molded article.

26. The wire clip system of claim 13, wherein the wire clip comprises metal.

27. The wire clip system of claim 13, wherein the second receptacle is sized to retain a different gauge of wire than the first receptacle.

28. The wire clip system of claim 13, further comprising a release liner covering a pressure sensitive adhesive on the receiver for adhering the receiver to a support surface.

29. A strand of decorative lights comprising:
a longitudinally elongated wire supporting a plurality of lights;
a plurality of wire clips retained on the wire at spaced apart intervals and comprising:
a first receptacle for retaining the wire; and
a base connected to the receptacle and carrying touch fastener elements; and
a plurality of fastening receivers carrying touch fastener elements releasably engageable with the touch fastener elements of the wire clips.

30. The light strand of claim 29, wherein the plurality of fastening receivers are of a continuous elongated strip to enable attachment of any of the wire clips anywhere along the length of the elongated strip.

31. The light strand of claim 29, wherein the touch fastener elements of the wire clips and of the fastening receivers are of a mutually-engaging construction.

32. The light strand of claim 29, wherein the touch fastener elements of the wire clips comprise one of an array of hook elements and a field of loop elements and the touch fastener elements of the fastening receivers comprise the other of an array of hook elements and a field of loop elements.

33. The light strand of claim 29, being packaged with the touch fastener elements of the fastening receivers engaged with the touch fastener elements of a corresponding wire clip.

34. The light strand of claim 33, wherein the fastening receivers include a pressure sensitive adhesive backing covered by a release liner.

35. The light strand of claim 29, wherein the wire clip comprises a second receptacle configured to retain the wire clip to the front upper edge of a rain gutter.

36. The light strand of claim 29, wherein the wire clip comprises a second receptacle configured to retain a second wire.

37. The light strand of claim 29, wherein the wire clip includes touch fastener elements on a second surface adjacent to the base.

* * * * *